United States Patent [19]

Amasino et al.

[11] 3,778,891

[45] Dec. 18, 1973

[54] METHOD OF SECURING DYNAMOELECTRIC MACHINE COILS BY SLOT WEDGE AND FILLER LOCKING MEANS

[75] Inventors: Richard L. Amasino, Trafford; Paul S. Johrde, Murrysville, both of Pa.

[73] Assignee: Westinghouse Electric Corporation, Pittsburgh, Pa.

[22] Filed: Oct. 30, 1972

[21] Appl. No.: 302,328

Related U.S. Application Data

[62] Division of Ser. No. 137,466, April 26, 1971.

[52] U.S. Cl. ............... 29/596, 29/453, 310/214
[51] Int. Cl. ............................................. H02k 15/00
[58] Field of Search ............. 29/596, 598, 453; 310/214, 215, 42

[56] References Cited
UNITED STATES PATENTS 2,723,358  11/1955  Holmgren ........................ 310/214
2,569,278   9/1951  Barth ............................. 310/214 X
3,391,294   7/1968  Moxie et al. ...................... 310/214

Primary Examiner—Richard J. Herbst
Assistant Examiner—Carl E. Hall
Attorney—A. T. Stratton et al.

[57] ABSTRACT

For retention of a coil in dynamoelectric machine core slots, a slot wedge is provided with a compressible end that is normally oversized in relation to the slot width. The wedge is compressed when driven through the slot. The oversized portion then expands when it reaches the first vent duct and locks the wedge in the slot. Another feature is to use a flexible insulating tape between the coil and the slot filler strips with ends extending from the slot so that they can be wrapped around the ends of the filler strips and be secured by a locking type wedge, which may be as described above, at each end of the stack.

6 Claims, 2 Drawing Figures

METHOD OF SECURING DYNAMOELECTRIC MACHINE COILS BY SLOT WEDGE AND FILLER LOCKING MEANS

CROSS REFERENCE TO RELATED APPLICATION

This application is a division of application Ser. No. 137,466, filed Apr. 26, 1971.

BACKGROUND OF THE INVENTION

1. Field of the Invention:

This invention relates to dynamoelectric machines and particularly to means for retention of coils in a core thereof.

2. Description of the Prior Art:

In relatively large dynamoelectric machines, means are required to secure the coils in the stator (and sometimes the rotor as well) to avoid excessive vibration. In the past it has been the practice to use as coil retaining elements a side filler driven between the coil and the adjacent slot wall, slot fillers above the coil at the slot opening and, over the slot fillers, a slot wedge. The slot wedge is configured to be driven in notches at the opening of the slot to prevent any radial movement of the wedge. Variously configured wedges have been used or disclosed in the past. Among them are slotted wedges that provide resiliency to permit the wedge to be driven in while giving a degree of extra secureness against the surfaces of the groove in which the wedge is positioned. U.S. Pat. Nos. 2,569,278 and 2,723,358 are representative of prior art showing slotted or grooved slot wedges.

To obtain positive locking of slot wedges as have been used in the past it has been necessary to provide an additional element outside the slot, adjacent to the end of the wedge, that is tied in or adhesively bonded to the core face. While generally effective, such additional elements for wedge locking are time consuming and expensive.

The slot fillers located between the slot wedge and the coil are also subject to dislocation in use if the wedge is not well secured. It is also possible that some longitudinal movement of a slot filler can occur even with a wedge securely in place.

SUMMARY OF THE INVENTION

This invention provides a means for positive locking of slot wedges and slot fillers. A slot wedge, which is of relatively rigid insulating material, is made to be resilient and compressible at one end as by providing at that end one or more longitudinal grooves extending a short distance, such as 1 or 2 inches, from the end. Also at that end are laterally extending projections to give the slot wedge a normal dimension, when uncompressed, that is oversized in relation to the core slot dimension. Upon compression of this end of the slot wedge, the wedge can be inserted in the slot and driven through the first pack of laminations. When the compressed end of the slot wedge emerges from the first pack, it expands to normal size with the projections locking into the first vent duct in the core. Wedge movements in both longitudinal directions is avoided by employing such a locking wedge at each end of a stack which comprises a plurality of packs of iron so that the locking wedge head is disposed against the end surface of an adjacent wedge in an interior pack of the stack.

An additional feature is the use of a flexible strip of material, such as a glass fiber banding type, disposed over the outside coil surface with ends extending from the slot. The slot fillers, which may be as previously constructed and used, are disposed over the flexible strip and slot wedges are positioned over the interior portions of the filler strips. Before locking wedges are disposed at the ends of the slots, the flexible strip is wrapped around the filler strips and brought to the top surface of the filler strips. A locking wedge is driven in over this surface with an end of the flexible strip extending between the locking wedge and the adjacent wedge. This arrangement at each end of the coil slot permanently secures the elements in position. The locking wedge may take various forms among which is that described above having a compressible end and locking tabs.

DESCRIPTION OF THE PREFERRED EMBODIMENTS

Figure 1:
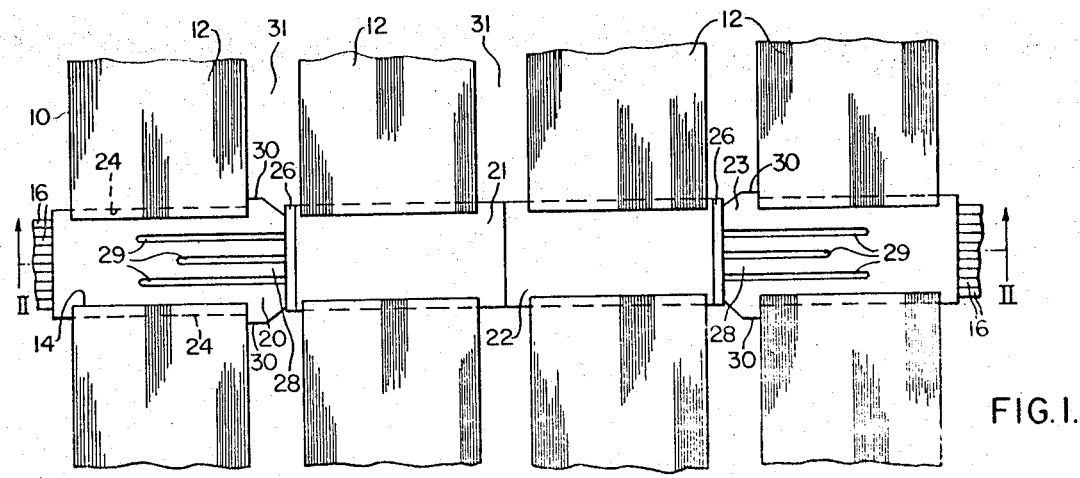
FIG. 1 is a partial view of the interior of a dynamoelectric machine stator embodying the present invention.
Figure 2:
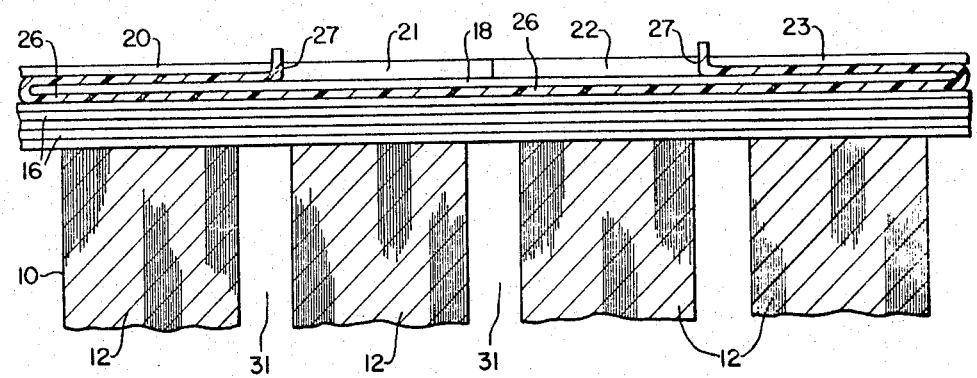
FIG. 2 is a cross-sectional view taken along the line II—II of FIG. 1.

Referring to FIG. 1, the invention is shown embodied in a dynamoelectric machine having a stator core 10 that normally comprises a plurality of packs 12 of metallic laminations with ventilating ducts 31 between adjacent packs 12. Coil slots 14, of which only one is shown, extend longitudinally through the core 10 for the disposition of coils 16, of which only one is shown, therein. The core 10 normally has the general configuration of a hollow cylinder of which only a small part is shown in FIG. 1. The invention is particularly described and applicable to the construction of stators of relatively large machines such as turbine generators, and has found particular application in vertically disposed water wheel generators. Vertical machines tend to present more frequent problems in retaining elements in the slots than do horizontal machines. However, the invention is not so limited and may be applied to stators of either horizontal or vertical disposition and may also be applied to rotor windings.

The coils 16 each comprise a plurality of conductors with an insulating covering around the conductors. Elements called side fillers (not shown) are normally disposed on one or both sides of the coils 16 to secure the coils from lateral movement in the slot 14. Securing of the coils 16 in the radial direction is effected by one or more slot fillers 18 and disposed over the coil and by slot wedges 20, 21, 22 and 23 (of which four are shown in this example) that are positioned in notches or grooves 24 in the walls of slot 14 that fix their radial location.

In accordance with a preferred form of this invention there is first applied to the insulate surface of coil 16 a layer 26 of flexible insulating mateial, such as a strip of glass fiber banding tape, of a length which is greater than the slot length. Over the flexible strip 26 are disposed one or more relatively more rigid slot filler members 18. They are positioned interior wedges 21 and 22 in the slot 14 by driving them into notches 24. Interior wedges 21 and 22 may be as previously formed, merely requiring a configuration that fits within the slot with substantial tightness but loose enough to be driven. Thus wedges 21 and 22 may have uniform lateral dimensions. After location of a sufficient number of interior wedges 21 and 22, the flexible strip 26 is wrapped around the ends of the filler strips 18 and past the outer ends 27 of the interior wedges 21 and 22. Locking wedges 20 and 23 are then applied one at each end of the stack 10, by being driven into the slot 14 and over the tape 26.

FIG. 1 shows a preferred form of locking wedges 20 and 23 (which may be identical) in accordance with this invention. The interior end 28 of each wedge 20 and 23 is made to be resilient and compressible, such as by one or more grooves 29 extending longitudinally from that end. The ends 28 also have lateral projections 30 so that in the uncompressed state the ends 28 are oversized in relation to the lateral dimensions of the notches 24. There is sufficient resiliency provided by the grooves 29, however, that the ends 28 of the wedges 20 and 23 can be compressed and fit into the slot and driven through. Upon being driven through the end pack of core laminations the end 28 expands and locks by having the grooved edge against the end of adjacent wedge 21 or 22 and the projections 30 held against the face of the end core pack in vent duct 31. When such locking wedges are employed at both ends of the core 10 there is a permanent securing of the wedge, filler, and coil combination with the core.

The materials employed for the various elements may be as have been used in the past. The wedges 20, 21 22 and 23 conveniently are of a resin impregnated glass fiber material. The grooves 29 which provide the resiliency may be saw cut into the ends 28. Typical thicknesses for the wedges are in the range of about 0.15 inch to about 0.20 inch. The width of the grooves 29 is at least sufficient to permit enough flexing of the extended portions 30 so the end 28 can be driven through the grooves 24. As an example, locking wedges as shown have been made with three grooves 29, each having a width of about 0.06 inch where the maximum width of the wedge at end 28 is about 1.10 inch and a portion of the wedge that remains in the channel 24, and fits relatively secure in that channel is about 0.95 inch. The outer two grooves 29 were about 1.5 inch long while the center grooves 29 was about 1 inch long.

The arrangement in accordance with this invention may be practiced without employing any adhesive material between the various elements. There may, however, be an application of an adhesive material to the extended end of the flexible insulating strip 26 (and/or to surfaces of the slot fillers and locking wedges) so that when the locking wedge 20 or 23 is driven in, the flexible strip 26 is bonded by the adhesive to both the end of the filler strips 18 and to the locking wedge 20 or 23.

As an additional alternative, when wedges 20 and 23 are in place, the grooves 29 may be filled with a material, such as an air-hardenable viscous resin, which when hard will prevent deflection of elements 30 that could result in movement of the wedges.

While the illustrative embodiment concerns a core 10 with a plurality of spaced packs 12, it can be seen that substantial advantage can also be obtained in applying the present invention to cores with a single, continuous pack of laminations. For example, the locking wedge 20 may be used as the only slot wedge in a continuous core with positive insurance of movement in one direction. Additional means, such as have been previously used, may be used to prevent movement in the other longitudinal direction, if necessary or desired.

We claim:

1. A method for securing a coil within a slot of a core of a dynamoelectric machine comprising the steps of: placing a flexible strip of insulating material over the exposed surface of a coil in a slot of said core with the ends of said strip extending from the slot ends; placing one or more slot filler members over said flexible strip; driving one or more interior slot wedges into grooves in the lateral walls of said slot near the opening thereof; wrapping said flexible strip ends over the end of said slot filler members said interior slot wedges and, while said flexible strip ends are in the foregoing position, driving into said grooves and over said flexible strip a locking slot wedge secured against longitudinal movement.

2. A method in accordance with claim 1 wherein; before said locking slot wedge is driven an end thereof with lateral projections is compressed in lateral dimension to fit within said grooves and the driving of said locking slot wedge is continued until said lateral projections have passed through a first pack of laminations of said core and expand to a locking position.

3. A method in accordance with claim 1 wherein: before said locking slot wedge is driven an adhesive material is applied to one or more of said elements to adhesively bond said flexible strip to said slot filler members and to said locking wedge when said locking wedge has been driven into position.

4. A method for securing coils in a slot of a dynamoelectric machine core comprising the steps of: placing at least one insulated coil into the slot; placing a flexible strip of insulating material on the coil, said strip having an end extending from an end of said slot; placing at least one slot filler member on said flexible strip; wrapping said end of said flexible strip over an end of said at least one slot filler member so a portion of said flexible strip lies on a top surface of said slot filler remote from said coil; and inserting a slot wedge on said portion of said flexible strip and said top surface of said slot filler.

5. The subject matter of claim 4 wherein: the inserting of said slot wedge is performed by driving a slot wedge longitudinally through grooves near the mouth of the slot.

6. The subject matter of claim 5 wherein: said slot wedge has a laterally compressible forward end with lateral projections which when driven through said core expand to a lateral dimensions exceeding the maximum groove width and lock said slot wedge against movement back toward the end from which it was driven.

* * * * *